United States Patent [19]

Harmony

[11] 4,077,570
[45] Mar. 7, 1978

[54] PENETRABLY MOUNTED EMITTER FOR CONDUITS

[75] Inventor: Richard C. Harmony, Tucson, Ariz.

[73] Assignee: Harmony Emitter Company, Inc., Tucson, Ariz.

[21] Appl. No.: 690,168

[22] Filed: May 26, 1976

[51] Int. Cl.² .............................................. B05B 1/32
[52] U.S. Cl. ..................................... 239/107; 138/46; 239/533.13; 239/542; 239/547
[58] Field of Search ............... 239/542, 547, 106, 107, 239/108, 533.13; 138/44, 45, 46

[56] References Cited

U.S. PATENT DOCUMENTS 3,779,468 12/1973 Spencer ........................... 239/547 X
3,980,104 9/1976 Kabai .............................. 239/547 X Primary Examiner—John J. Love
Assistant Examiner—Michael Mar
Attorney, Agent, or Firm—Cahill, Sutton & Thomas

[57] ABSTRACT

A miniaturized emitter, penetrably mounted within the wall of a conduit having a fluid to be dispensed, emits a constant volume output flow irrespective of changes in fluid pressure within the conduit. An annular flange laterally biased by an inscribed annular pressure chamber sealingly seats the emitter against the wall of the conduit. A pair of downwardly depending skirts having striae disposed on facing surfaces, in combination with the extant pressure on the opposing sides of the skirts, regulate the passage size within the emitter to maintain constant the rate of output fluid flow regardless of pressure variations within the conduit.

24 Claims, 6 Drawing Figures

PENETRABLY MOUNTED EMITTER FOR CONDUITS

The present application is related to a patent application entitled "FLUID FLOW REGULATOR", filed Aug. 13, 1975, and assigned Ser. No. 604,146, now U.S. Pat. No. 3,993,248, a patent application entitled "PIPE INSERTABLE EMITTER FOR IRRIGATION SYSTEMS", filed Mar. 6, 1975, and assigned Ser. No. 555,945, now U.S. Pat. No. 3,970,251, a U.S. Pat. No. 3,917,169, issued Nov. 4, 1975, entitled "EMITTER FOR IRRIGATION SYSTEMS", which patent is a continuation in part of U.S. Pat. No. 3,899,136, issued Aug. 12, 1975 and entitled "EMITTER FOR IRRIGATION SYSTEMS", all of the above patents and applications therefor describe inventions made by the present inventor and assigned to the present assignee.

The present invention relates to fluid dispensing apparatus and, more particularly, to a miniaturized regulator for dispensing a fluid within a conduit at a constant flow rate regardless of fluid pressure variations within the conduit.

Irrigation devices of various types have been available for a number of years. These devices may generally be classified in one of two categories: those intended for home use and those intended for industrial application.

The devices intended for home use are usually attachable to a standard water hose and include a multiport pressure reducing chamber. The water outflow is at a sufficiently low rate so as not to erode the soil from about plant roots. The rate of water flow is, however, dependent upon the water pressure within the water hose. Therefore, some judgment must be exercised in controlling the water flow through the water hose. This problem is exacerbated where a plurality of devices are attached to a common water hose.

Where clean water is used, such as available from municipal water systems, no clogging problems usually develop; however, if the water contains particulate matter of greater than microscopic size, such as might occur from unfiltered wells, one or more ports within the device(s) generally become clogged. The clogging causes a resulting increase in the rate of water flow through the remaining ports. The force of the increased water flow can and often does cause erosion of the adjacent soil. Moreover, clogging of several ports may sufficiently restrict the volume of water output from one or more devices. In addition, it will affect the rate of water flow through the remaining devices.

Irrigation devices intended for industrial use are generally connected to a source of irrigation water, that is, water which does contain suspended particulate matter. To overcome the clogging effects of the particulate matter, the outlet ports in these devices are generally of resilient material to permit them to expand as necessary to pass the particulate matter. Where a port expands to pass the particulate matter, the rate of water flow therethrough simultaneously increases. The increased water flow tends to reduce the water pressure within the common envelope feeding the devices and results in a reduction of water flow through the remaining devices. Thereby, uneven irrigation often results. Due to aging, the resilient material may not be able to contract to its initial size and thereby may contribute to an uneven rate of water discharge.

Where a plurality of non-self regulating water discharge devices or ports are disposed along a length of hose, a substantial pressure gradient exists through the length of the hose. The pressure gradient, in turn, tends to cause a proportional water flow output from the devices or their ports. Such variation in water flow results in non-uniform irrigation along the length of the hose. The following patents are representative of the state of the art in stokers and irrigation devices: U.S. Pat. Nos. 1,366,685, 2,543,775, 2,775,984, 2,851,306, 2,961,109, 3,084,334, 3,116,019, 3,221,996, 3,308,800, 3,546,884, 3,552,654, 3,667,685, 3,685,735, 3,693,888, 3,698,195, 3,767,124, 3,777,980, 3,777,987, 3,779,468, 3,780,946, 3,788,544, 3,797,741, 3,797,754, 3,814,377 and 3,899,136.

Because of the nature of the above described devices, their application has been generally limited to that of fruit bearing bushes and trees and other plants which need not be replanted seasonally. For seasonal and machine harvested plants, such as various grains, vegetables and fruits, the labor costs attendant the laying out and retrieval of the above described devices generally precludes them from being practical for irrigation purposes. For such crops, irrigation devices must be capable of being laid by machine and must be sufficiently inexpensive to permit discarding them at the conclusion of the growing season.

Where one is considering employment of emitters for irrigation of large fields, the size of the emitters to be used becomes a serious consideration because of related storage and handling problems. Furthermore, to maintain low labor costs, the emitters must be readily and easily mountable upon or within the fluid conveying conduits. Should the emitters be mounted upon the conduits prior to laying the conduits on or beneath the surface of the ground, the additional bulk necessitated by the attached emitters must be sufficiently minimal to permit normal handling of the conduit or else the related storage and handling requirements may be of sufficient magnitude to negate effective commercial deployment of the emitters.

It is therefore a primary object of the present invention to provide a miniaturized emitter which discharges fluid at a constant rate despite variations in fluid pressure.

Another object of the present invention is to provide an emitter penetrably mounted within the wall of a fluid conveying conduit.

Yet another object of the present invention is to provide a penetrably mounted emitter having a seal biased by the pressure within the fluid conveying conduit supporting the emitter.

Still another object of the present invention is to provide an emitter which will pass suspended particulate matter.

A further object of the present invention is to provide a miniaturized emitter which maintains a constant fluid flow discharge rate regardless of variations in pressure within the fluid conveying conduit.

A yet further object of the present invention is to provide a miniaturized emitter which is mountable within a fluid conveying conduit prior to utilization and laying out of the conduit.

A still further object of the present invention is to provide a miniaturized emitter which represents only a slight protubation upon the exterior surface of a supporting conduit.

These and other objects of the present invention will become apparent to those skilled in the art as the description thereof proceeds.

The present invention may be described with greater specificity and clarity with reference to the following drawings, in which.

Figure 1:
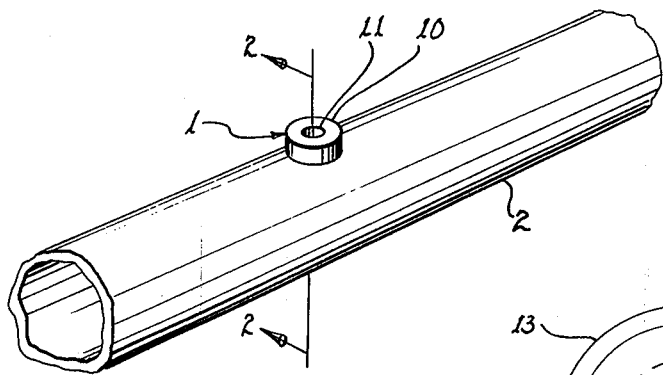
FIG. 1 illustrates an emitter penetrably mounted within the wall of a fluid conveying conduit.

An emitter 1, constructed in accordance with the teachings of the present invention is penetrably mounted within the wall of a conduit 2, as illustrated in FIG. 1. As is evident from the illustration, protruding head 10 of the emitter is relatively small sized and yet includes a centrally located discharge outlet 11. Although emitter 1 is depicted as being mounted upon the uppermost part of conduit 2, the circumferential position of the emitter about the conduit has no effect upon either the operability of the emitter nor the rate of fluid flow through the emitter, as will be explained in further detail below. The conduit itself may be flexible or rigid and formed of metallic, plastic or other materials, the selection of which has no appreciable effect upon the emitter, its retention or its operation.

Figure 3:
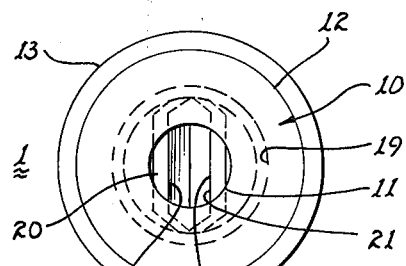
FIG. 3 is a top view of the emitter shown in FIG. 3.
Figure 4:
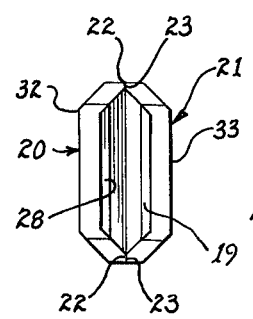
FIG. 4 is a bottom view of the emitter taken along lines 4—4, as shown in FIG. 2.

The structural details of emitter 1 will be described with primary reference to FIGS. 2, 3 and 4. The emitter, having a longitudinal axis superimposed upon a radial line extending from conduit 2, is symmetric about its longitudinal axis. Thereby, the protruding part of head 10 is disc-shaped and discharge outlet 11 represents a cylindrical cavity centered upon the longitudinal axis. An annular flange 13 is segregated from disc-like element 12 by an annular channel 14 having walls 16, 17 defining radial sides of the flange and the disc-like element, respectively. A downwardly opening annular depression 19, or pressure chamber, is disposed within head 10 intermediate discharge outlet 11 and the bases of flange 13 and channel 14.

A pair of skirts 20 and 21 depend downwardly from head 10 beneath discharge outlet 11. These skirts define a passageway for the flow of fluid from within conduit 2 to the discharge outlet through an orifice 26. Lateral edges 22 and 23 of skirts 20 and 21 are smooth surfaced and the upper parts thereof are positioned adjacent one another. The lower extremities of the skirts extend downwardly in a diverging relationship. The cross-sectional configuration of the skirts, in the horizontal plane, may define a U-shape having gently sloping sides, as depicted in FIG. 4, or the surfaces of the skirts may define two parallel planes. One or both of skirt surfaces 28 and 29 facing one another may be striated with striae 30 and 31. The outer surfaces 32 and 33 of the skirts may be planar or striated or embossed, the configuration of which has no appreciable effect upon the operation of the emitter. To aid in flexing of the skirts, the lower cylindrical surface of discharge outlet 11 may be undercut to reduce the mass and hence the resistance to flexing of the skirts at the junction of the skirts and the head. Similarly, the bottom surface of the discharge outlet may be grooved to reduce the mass at the junction of the head and the skirts to reduce the resistance to flexing at the junction of the head and the skirts.

In operation, emitter 1 is penetrably inserted through aperture 15 within wall 16 of conduit 2 until the interior surface of the aperture rests within channel 14. In this position, side wall 16 of annular flange 13 adjacent the interior of wall 18 will resist ejection of emitter 1 despite the normally expected pressure exerted by a fluid within conduit 2. Similarly, side wall 17 of disc-like element 12 will inhibit complete insertion of emitter 1 into the conduit through aperture 15. Once fluid is introduced into conduit 2 under pressure, the fluid pressure which exists within annular depression 19 will tend to urge lateral radial movement of annular flange 13 and the base of channel 14. Such radial urging will tend to produce a bias force which promotes sealing contact intermediate side wall 16 of the annular flange and the interior contacted surface of wall 16 and sealing contact intermediate the base of channel 14 and the interior surface of aperture 15. Thereby, fluid leakage about emitter 1 is essentially precluded without the need for further mechanical sealing elements, sealing processes or sealants.

The fluid under pressure within conduit 2 will flow intermediate skirts 20 and 21 into the passageway defined by striae 30 and 31 and discharge through orifice 26 into discharge outlet 11. The striae, whether on one or both of surfaces 30, 31 will cause the fluid flow therebetween to be random and turbulent. The randomness and turbulence of the fluid flow will establish a fluid pressure gradient from the lower edges of the skirt to orifice 26. Simultaneously, the fluid within conduit 2 will exert pressure upon the outer surfaces 32 and 33 of skirts 20 and 21, respectively, which pressure forces the skirts toward one another and restrains separation therebetween. Hence, lateral expansion of skirts 20 and 21 produced by the fluid pressure intermediate the skirts is countered by the fluid pressure acting upon the outer surfaces of the skirts. Since the fluid pressure decreases from the lower edges of the skirts to orifice 26 intermediate the skirts due to the pressure gradient and the pressure adjacent outer surfaces 32 and 33 remain essentially constant therealong, the upper parts of the skirts will be biased toward one another and enlargement of orifice 26 will be restrained. That is, the skirts are pressure compensating and regulate the size of the passageway intermediate surfaces 28 and 29 through orifice 26. Thus, the rate of fluid discharge from the regulator is a function of the striated surfaces of skirts 20 and 21 and is independent of the fluid pressure within conduit 1. Should the fluid pressure within conduit 2 vary at different emitter locations, each emitter will accommodate such variation while providing an essentially constant rate of fluid discharge therefrom.

As stated above, the interstices between the skirts determine the fluid flow which will occur regardless of the amount of fluid pressure within conduit 2. This results because a higher level pressure gradient intermediate skirts 20 and 21 would tend to laterally displace the skirts from one another and thereby expand the passageway. An expanded passageway would, of course, increase the water flow rate therethrough and through orifice 26 into discharge outlet 11. However, the expansion is inhibited by the simultaneous increase in fluid pressure adjacent the outer surfaces 32 and 33 of skirts 20 and 21, respectively. The increase in fluid pressure thereon will tend to force surfaces 28 and 29 adjacent one another and restrict fluid flow therebetween. Moreover, the pressure differential established by the pressure gradient may possibly compress opposed ridges of the striated surfaces in proximity to orifice 26 to minimize the size of the interstices and constrain the flow rate increase commensurate with the fluid pressure increase. Thus, a predetermined and regulated fluid flow will occur through each emitter despite an increase in the fluid pressure within conduit 2.

If the fluid conduit 2 is contaminated by suspended particulate matter, it is quite likely that the particulate matter will be forced intermediate skirts 20 and 21. Should the particulate matter be too large to flow freely through the interstices, it may become lodged intermediate surfaces 28 and 29. In order for the particulate matter to become lodged, it will have to exert a lateral force upon each of skirts 20 and 21. Such a lateral force will tend to displace the skirts from one another. The increased displacement will tend to minimize the pressure gradient and increase the fluid flow rate in proximity thereto and thereby establish a force to propell the particulate matter through orifice 26 into discharge outlet 11. Thus, the emitter is both self-cleaning and non-clogging.

Prior to introduction of fluid into conduit 1 or prior to the establishment of more than a predetermined pressure level within the conduit, skirts 20, 21, in the releaxed or quiescent configuration, will be positioned apart from one another to define an unobstructed passageway therethrough from interior the conduit into the discharge outlet. This unobstructed passageway will exist until such time as the ambient pressure attendant surfaces 32 and 33 of the skirts, in combination with a coestablished partial pressure gradient intermediate surfaces 28 and 39, increases to the predeterminable level of pressure. Upon a pressure buildup to the predeterminable pressure level, the skirts will flex toward one another from their relaxed state and the fluid flow within the passageway therebetween will become restricted in the manner outlined above. Thus, during initial fluid flow through emitter 1, a purging action occurs which voids the passageway of any existing obstructions or foreign matter. Likewise, on cessation of fluid flow (fluid pressure) within the conduit, the skirts will flex apart from one another to open the passageway. The opened, or unobstructed, passageway will allow purging to occur. Thereby, the passageway within the emitter is voided of any existing obstructions or foreign matter on cessation of fluid flow within the conduit.

Figure 5:
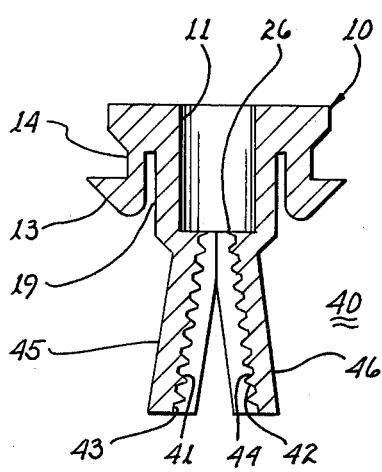
FIG. 5 is a cross-sectional view of a variant of the emitter.

For any given quiescent spacing of skirts 20 and 21, a constant fluid discharge rate therethrough will occur. In order to obtain different fluid flow discharge rates, the spacing intermediate facing surfaces of the skirts is varied or the magnitude of the striae is varied or a combination of spacing and striae magnitude may be undertaken. FIG. 5 illustrates an emitter 40 essentially idential with emitter 1 illustrated in FIG. 2 except that the magnitude of striae 41 and 42 within facing surfaces 43 and 44 of skirts 45 and 46 have been increased by a substantial amount. At some point, of course, the magnitude of the striae may be such as to no longer be capable of establishing an adequate operative pressure gradient. Should a flow rate exceeding that available from the increased magnitude striae but not available without destroying the capability of generating a pressure gradient be sought, further modification may be undertaken.

Figure 2:
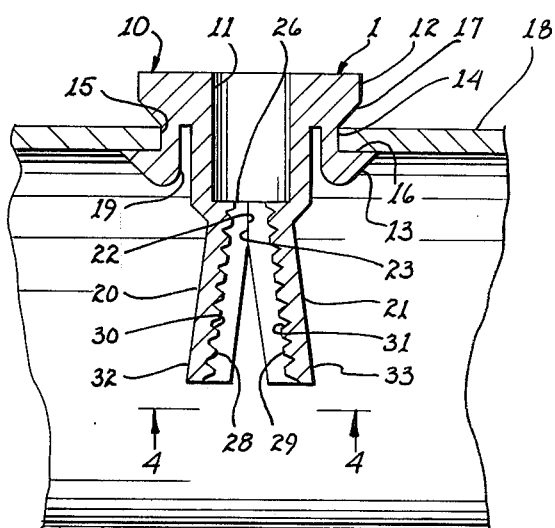
FIG. 2 is a cross-section taken along lines 2—2, as shown in FIG. 1, of the emitter penetrably mounted within the conduit.
Figure 6:
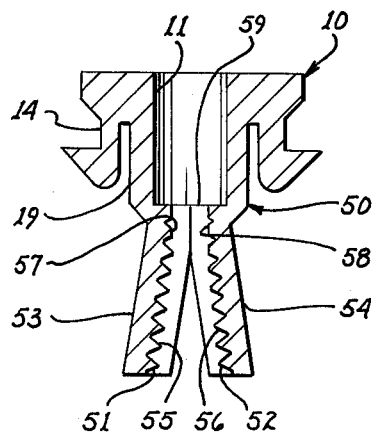
FIG. 6 is a cross-sectional view of a further variant of the emitter.

Referring to FIG. 6, there is shown yet another emitter 50 which is also essentially identical to emitter 1 illustrated in FIG. 2 except for the configuration of facing surfaces 51 and 52 of skirts 53 and 54. Herein, striae 55 and 56 have been increased in magnitude to the extent available while still maintaining the capability for establishing a pressure gradient. In addition, the upper part 57 and 58 of surfaces 51 and 52 have been shaved or otherwise contoured so as to preclude reducing the size of orifice 59 below a predeterminable minimum size. Thereby, the minimum fluid flow rate is essentially controlled by the size of orifice 59 for a given minimum operative fluid pressure within conduit 2 and skirts 53 and 54 preclude an increase of the flow rate despite increases in fluid pressure within conduit 2 through their operation as discussed above.

It may be of interest to briefly discuss and review the actual size and material composition of the emitter described herein. Test and production models of the emitter have a head diameter of approximately one quarter inch and the head protrudes above the conduit approximately three-sixteenths of an inch. The diameter of the discharge outlet is approximately one sixteenth of an inch. The emitter penetrates into the conduit approximately one quarter of an inch, of which three sixteenths of an inch represents the skirt length. Tests are presently underway to reduce protrusion of the head to approximately one sixteenth of an inch.

The emitter is manufactured of a silicone compound having a hardness factor of approximately 50–70 shore. By employing silicone compounds, the emitter is essentially impervious to almost any type of fluid which is to be discharged from a conduit. Moreover, silicone compounds have a degree of resiliency and elasticity which are essentially non-aging and therefore particularly suitable for the continuing need for the skirts to flex in response to fluid pressure changes within a conduit. Additionally, the resilient and elastic characteristics tend to continuously maintain an effective seal about the aperture within the wall of the conduit to avoid unmetered discharge of the fluid due to leakage.

While the presently contemplated major commercial advantage of the present invention lies in irrigation systems, fluid flow regulators constructed in accordance with the principles of the present invention may be feasibly and importantly employed in many other unrelated fields of technology where continuing accurate and self compensating fluid flow regulation is necessary. Moreover, the production costs are extremely low on a per unit basis as the present invention can be manufactured by injection molding techniques. Thus, it may be possible economically to install the emitters for a one time use and discard them thereafter. If the latter is undertaken, it would, of course, be preferable that the emitters as well as the supporting conduits be of biodegradable materials to permit them to become assimilated within the environment wherein they have been placed.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. An emitter for discharging fluid from a fluid conveying conduit at a constant rate despite changes in pressure within the conduit, said emitter being penetratingly insertable within an aperture in the wall of the conduit, said emitter comprising:

a. a head including a discharge outlet having an axis normal to the wall of the conduit for conveying fluid from within the conduit and through the wall of the conduit;
b. an annular channel disposed about said head for receivingly engaging the edge of the aperture in the wall of the conduit;
c. an annular flange disposed adjacent said channel for contactingly engaging the inner wall surface of the conduit adjacent the aperture to maintain said emitter in place; and
d. bias means extending from said head interior to the conduit for maintaining a constant rate of fluid flow through said discharge outlet despite variations in pressure within the conduit, said bias means being disposed in axial alignment with said discharge outlet, said bias means including a pair of opposed skirts longitudinally separable from one another for defining a single passageway for the flow of fluid to said discharge outlet, said passageway being in general axial alignment with said discharge outlet;

whereby, said emitter is penetratingly mountable within an aperture in the conduit to maintain a constant rate of fluid discharge from the conduit despite variations in fluid pressure within the conduit.

2. The emitter as set forth in claim 1 including a pressure chamber disposed within said head for urging radial expansion of said annular flange, said pressure chamber being responsive to the fluid pressure within the conduit.

3. The emitter as set forth in claim 1 including means for inhibiting operation of said bias means below a predetermined fluid pressure level within the conduit; whereby, said emitter is self purging until the fluid pressure within the conduit is above a predetermined level.

4. The emitter as set forth in claim 3 wherein said inhibiting means compresses the non-flexed state of said pair of skirts with respect to said head.

5. The emitter as set forth in claim 1 including means for purging said emitter whenever the fluid pressure within said conduit is below a predetermined pressure level.

6. The emitter as set forth in claim 5 wherein said purging means comprises the state of flex of said pair of skirts depending from said head while the pressure within the conduit is below a predetermined level.

7. The emitter as set forth in claim 2 wherein said pressure chamber is a downwardly opening annular depression concentric with the axis of said discharge outlet.

8. The emitter as set forth in claim 7 wherein said annular depression is inscribed by said channel, whereby said pressure chamber exerts a radially directed force upon the base of said channel to urge sealing intermediate said channel and the side of the aperture.

9. The emitter as set forth in claim 8 including an orifice having a common axis with said discharge outlet and defined by said pair of skirts and disposed at the junction of the passageway formed by said pair of skirts and said discharge outlet.

10. An emitter for discharging fluid from a fluid conveying conduit at a constant rate despite changes in pressure within the conduit, said emitter being penetratingly insertable within an aperture in the wall of the conduit, said emitter comprising:

a. a head having a discharge outlet for conveying fluid from within the conduit and through the wall of the conduit;
b. an annular channel disposed about said head for receivingly engaging the edge of the aperture in the wall of the conduit;
c. an annular flange disposed adjacent said channel for contactingly engaging the inner wall surface of the conduit adjacent the aperture to maintain said emitter in place;
d. a pressure chamber comprising a downwardly opening annular depression inscribed by said channel and disposed within said head for urging radial expansion of said annular flange, said pressure chamber being responsive to the fluid pressure within the conduit;
e. bias means extending from said head interior to the conduit for maintaining a constant rate of fluid flow through said discharge outlet despite variations in pressure within the conduit, said bias means including a pair of opposed skirts separable from one another for defining a single passageway for the flow of fluid to said discharge outlet and further defining an orifice at the junction of said passageway and said discharge outlet; and
f. striae disposed upon the surface of at least one of said pair of skirts forming the passageway;

whereby, said emitter is penetratingly mountable within an aperture in the conduit to maintain a constant rate of fluid discharge from the conduit despite variations in fluid pressure within the conduit.

11. The emitter as set forth in claim 10 wherein facing surfaces of said pair of skirts forming the passageway include striae.

12. The emitter as set forth in claim 11 wherein the lateral edges of said pair of skirts adjacent one another in proximity to said head are smooth surfaced to inhibit lateral fluid flow into and out of the passageway formed by said pair of skirts.

13. The emitter as set forth in claim 12 wherein said emitter is molded of flexible material.

14. The emitter as set forth in claim 13 wherein said emitter is molded of silicone having a hardness of 50-70 shore.

15. The emitter as set forth in claim 14 wherein the width of said emitter is not greater than ¼ inch and the length of said emitter is not greater than ½ inch.

16. The emitter as set forth in claim 12 wherein said emitter is of single piece construction.

17. The emitter as set forth in claim 13 wherein said emitter is of biodegradeable material.

18. The emitter as set forth in claim 10 wherein the end of said discharge outlet in proximity to said pair of skirts is undercut to minimize the mass at the junction of said head and said pair of skirts.

19. The emitter as set forth in claim 10 including means for inhibiting operation of said bias means below a predetermined fluid pressure level within the conduit; whereby, said emitter is self purging until the fluid pressure within the conduit is above a predetermined level.

20. The emitter as set forth in claim 19 wherein said inhibiting means comprises the non-flexed state of said pair of skirts with respect to said head.

21. The emitter as set forth in claim 10 including means for purging said emitter whenever the fluid pressure within said conduit is below a predetermined pressure level.

22. The emitter as set forth in claim 21 wherein said purging means comprises the state of flex of said pair of skirts depending from said head while the pressure within the conduit is below a predetermined level.

23. An emitter for discharging fluid from a fluid conveying conduit at a constant rate despite changes in pressure within the conduit, said emitter being penetratingly insertable within an aperture in the wall of the conduit, said emitter comprising:
 a. a head having a discharge outlet for conveying fluid from within the conduit and through the wall of the conduit;
 b. an annular channel disposed about said head for receivingly engaging the edge of the aperture in the wall of the conduit;
 c. an annular flange disposed adjacent said channel for contactingly engaging the inner wall surface of the conduit adjacent the aperture to maintain said emitter in place, a radial surface of said annular flange being an extension of a side wall of said annular channel;
 d. bias means extending from said head interior to the conduit for maintaining a constant rate of fluid flow through said discharge outlet despite variations in pressure within the conduit, said bias means including a pair of opposed skirts separable from one another for defining a single passageway for the flow of fluid to said discharge outlet;
whereby, said emitter is penetratingly mountable within an aperture in the conduit to maintain a constant rate of fluid discharge from the conduit despite variations in fluid pressure within the conduit.

24. An emitter for discharging fluid from a fluid conveying conduit at a constant rate despite changes in pressure within the conduit, said emitter being penetratingly insertable within an aperture in the wall of the conduit, said emitter comprising:
 a. a head having a discharge outlet for conveying fluid from within the conduit and through the wall of the conduit;
 b. an annular channel disposed about said head for receivingly engaging the edge of the aperture in the wall of the conduit;
 c. an annular flange disposed adjacent said channel for contactingly engaging the inner wall surface of the conduit adjacent the aperture to maintain said emitter in place; and
 d. bias means extending from said head interior to the conduit for maintaining a constant rate of fluid flow through said discharge outlet despite variations in pressure within the conduit, said bias means including a pair of opposed skirts separable from one another for defining a single passageway for the flow of fluid to said discharge outlet, each skirt of said pair of skirts being non-planar;
whereby, said emitter is penetratingly mountable within an aperture in the conduit to maintain a constant rate of fluid discharge from the conduit despite variations in fluid pressure within the conduit.

* * * * *